ions of Maine
No Drawing. Filed Sept. 27, 1960, Ser. No. 58,648
4 Claims. (Cl. 260—606.5)

The present invention relates to novel olefinically-unsaturated tertiary phosphine oxides of the formula

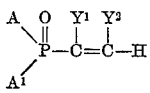

wherein A and $A^1$, respectively, represent a member selected from the group consisting of alkyl $C_1$–$C_{18}$, substituted and unsubstituted, aryl, substituted and unsubstituted, and cycloalkyl, substituted and unsubstituted; $Y^1$ is a member selected from the group consisting of hydrogen and halogen and $Y^2$ is a member selected from the group consisting of hydrogen, halogen, alkyl $C_1$–$C_{16}$, substituted and unsubstituted, alkenyl $C_1$–$C_{16}$, substituted and unsubstituted.

The new and useful compounds contemplated herein are prepared as exemplified by the following typical embodiment. Chlorodiphenylphosphine is reacted with ethanol in the presence of triethylamine to produce the corresponding diphenylethoxyphosphine. This product is then brought into reactive contact with 1,2-dibromoethane to produce 2-bromoethyldiphenylphosphine oxide. This latter product, in turn, is reacted with triethylamine to yield diphenylvinylphosphine oxide and by-product triethylamine hydrobromide.

In equation form the instant embodiment may be represented as follows:

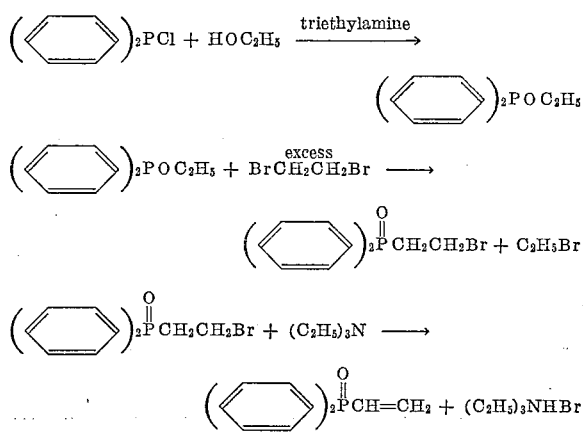

Generically the process of the present invention may be represented by the following equations:

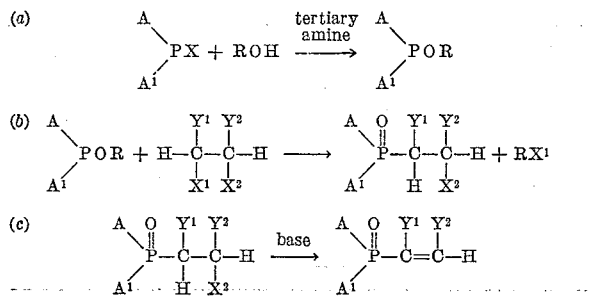

wherein X, $X^1$ and $X^2$, respectively, represent halogen, R is the residue of a lower alkyl, monohydric alcohol, and A, $A^1$, $Y^1$ and $Y^2$ are the same as above.

Typical phosphine reactants within the purview of the instant discovery are:

Chlorodicyclohexylphosphine
Bromodicyclohexylphosphine
Chloroethylmethylphosphine
Bromoethylmethylphosphine
Diethylchlorophosphine
Diethyliodophosphine
Bromodiethylphosphine
Chlorodiproplyphosphine
Bromodipropylphosphine
Dipropyliodophosphine
Chlorodibutylphosphine
Bromodibutylphosphine
Chlorodiphenylphosphine
Diphenyliodophosphine
Bromodiphenylphosphine
Chloroethylphenylphosphine
Bis(2-cyanoethyl)bromophosphine
Bromoethylphenylphosphine
Chlorophenylpropylphosphine
Bis(2-chlorophenyl)chlorophosphine
Bis(2-chlorophenyl)bromophosphine
Bis(4-chlorophenyl)chlorophosphine
Bis(4-chlorophenyl)bromophosphine
Bis(4-nitrophenyl)chlorophosphine
Bis(4-nitrophenyl)bromophosphine
Bis(4-methylphenyl)chlorophosphine
Bis(4-methylphenyl)bromophosphine
Bis(4-ethylphenyl)bromophosphine
Chloro-4-methylphenyl-phenylphosphine
Bromo-4-methylphenyl-phenylphosphine
Bis(2-methylphenyl)chlorophosphine
Bis(2-butylphenyl)chlorophosphine
Bis(2-methylphenyl)bromophosphine
Chloro-bis(1-naphthyl)phosphine
Bis(1-naphthyl)bromophosphine
Chlorodidodecylphosphine
Chlorodioctylphosphine
Chlorodioctadecylphosphine It follows from this list that typical substituents, and preferred substituents, within the purview of the instant discovery are nitro, cyano, lower alkyl and halogen, such as chloro, bromo and iodo. Of course, other substituents which under the conditions of the reactions are inert are contemplated herein.

Typical saturated monohydric alcohols are the lower alkyl alcohols, such as methanol, ethanol, propanol, isopropanol and butanol.

The tertiary amines contemplated herein are the trialkylamines, such as the tri-lower alkyl amines, pyridine, dimethylaniline, and the like.

With reference to generic Equation (c), above, organic and inorganic bases are contemplated herein, these bases being either strong or weak. Typical such bases are the alkali metal hydroxides (including ammonium hydroxide), the alkali metal lower alkoxides, tertiary amines of the type given above, and the like.

As to the organic halide reactants contemplated in generic Equation (b), above, the following are exemplary: 1,2-dibromoethane, 1,2-dichloroethane, 1,1,2,2-tetrachloroethane, 1-bromo-2-chloroethane, 1,1,2,2-tetrabromoethane, 3,4-dichlorobutene-1, and the like.

Reaction (a), above, may be carried out in the presence of an inert organic solvent, such as an aromatic hydrocarbon, an ether, an aliphatic hydrocarbon, or the like. Typical solvents are benzene, toluene, xylene, dioxane, tetrahydrofuran, butane, octane, and the like. This reaction is best carried out at a temperature in the range of 0° C. to the reflux temperature of the solvent. Preferably, a small excess of the alcohol reactant, based upon the phosphine reactant, is employed.

It should be noted, however, that Reaction (a) is effective whether the reactants are present in stoichiometric quantities or whether one reactant is present in excess over the other.

Reaction (b), above, is best carried out at a temperature in the range of 15° C. to 200° C. As in the case of Reaction (a), reflux temperatures are desirable depending upon the reactants employed and reaction is usually terminated when distillation ceases, which is an indication that substantially all the byproduct halide ($RX^1$) is recovered. Therefore, reaction is usually terminated when substantially all the byproduct halide is produced. Pursuant to Reaction (b) best results are obtained when the halide reactant is present in an amount in excess of stoichiometric, e.g. at least 25 percent greater than stoichiometric. However, satisfactory results are achieved using stoichiometric quantities of the reactants.

Reaction (c), above, is usually carried out in the presence of a solvent, preferably an alcohol, e.g. ethanol, isopropanol, and the like, and at a temperature in the range of 0° C. to the reflux temperature of the alcohol. Other useful solvents are aromatic hydrocarbons, such as toluene, benzene, xylene, and the like. When using a tertiary amine as a base, an excess or stoichiometric quantities thereof, based upon the phosphine reactant, are suitable.

It should be pointed out that atmospheric, subatmospheric and superatmospheric pressures are contemplated herein for Reactions (a) and (c), above. Reaction (b) is generally carried out at atmospheric pressure.

The reactions of the present invention may be batch, continuous or semi-continuous.

The novel products of the present invention represented by the general formula

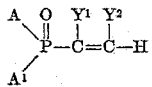

are useful as gasoline additives. For example, up to about 10 milliliters of any one of these novel compounds, when dissolved in one gallon of gasoline, affords protection against misfiring, surface ignition, and the like.

The instant discovery will best be understood by reference to the following examples:

EXAMPLE I

*Diphenylvinylphosphine Oxide*

To a solution of 27.4 grams ethanol (0.60 mole) and 54.5 grams triethylamine (0.53 mole) in 300 milliliters benzene is slowly added, with stirring, 109.5 grams chlorodiphenylphosphine (0.50 mole). The mixture is kept at 20° C.–30° C. during the 20-minute addition period and is stirred at room temperature for an additional 2 hours. Triethylamine hydrochloride is formed and is removed by filtration, and the resulting mixture is fractionally distilled. An 87 percent by weight yield, 98.85 grams of diphenylethoxyphosphine, is obtained, boiling point 121° C. at 0.7 millimeter mercury pressure.

*Analysis.*—Calculated for $C_{14}H_{15}OP$: C, 73.0; H, 6.52; P, 13.47. Found: C, 73.21; H, 6.63; P. 13.33.

Into an excess of 1,2-dibromoethane (1440 grams, 7.62 moles) is slowly added 86.0 grams diphenylethoxyphosphine (0.374 mole). The mixture is brought to a reflux below an 18-inch silvered glass helice packed, vacuum jacketed column. Bromoethane is formed and removed as it forms. No more bromoethane is noticed after two hours. Excess 1,2-dibromoethane is removed by distillation and cumene (which acts as a "chaser") is added to remove the final traces of bromoethane. The final reaction mixture is a mixture of 2-bromoethyldiphenylphosphine oxide in cumene.

This mixture is diluted with 300 milliliters toluene. With stirring 42.0 grams triethylamine (0.415 mole) is slowly added thereto. No exotherm occurs nor is any salt immediately visible. Upon heating at reflux for 1½ hours a large amount of salt appears. An additional 5.0 grams triethylamine in 100 milliliters toluene is added to insure complete reaction. After two more hours of reflux, the solution is cooled and the resulting triethylamine hydrobromide filtered off. Some of the product comes out of solution at this point and is later recovered. The bulk of the product is obtained by reducing the toluene volume, diluting with heptane and cooling. An overall yield of 60.8 grams of diphenylvinylphosphine oxide is obtained, melting point 116.5° C.–118° C. This is 71.5 percent yield by weight based on diphenylethoxyphosphine reactant and 62 percent based on chlorodiphenylphosphine reactant.

*Analysis.*—Calculated for $C_{14}H_{13}OP$: C, 73.9; H, 5.70; P, 13.6; Iodine No. 111.5. Found: C, 73.6; H, 6.20; P, 13.8; Iodine No. 109.5.

EXAMPLES II–XII

The following tables further illustrate, respectively, Equations (a), (b) and (c), above, of the instant discovery:

TABLE I

*Equation (a)*

| Ex. No. | Phosphine reactant | Alcohol reactant | Mol ratio phosphine to alcohol | Tertiary amine | Reaction temperature, °C. | Solvent | Tertiary phosphine product |
| --- | --- | --- | --- | --- | --- | --- | --- |
| II | Bromodicyclohexylphosphine | Butanol | 1:1 | Tributylamine | 25 | Dioxane | Butoxydicyclohexylphosphine. |
| III | Chlorodicyclohexylphosphine | do | 1:1 | do | 25 | do | Do. |
| IV | Bromoethylmethylphosphine | Ethanol | 1:1 | Triethylamine | 30 | Benzene | Ethoxyethylmethylphosphine. |
| V | Chlorodibutylphosphine | Propanol | 1:2 | Tripropylamine | 23 | Toluene | Dibutylpropoxyphosphine. |
| VI | Bis(2-chlorophenyl)chlorophosphine | Methanol | 1:1 | Trimethylamine | 20 | Xylene | Bis(2-chlorophenyl)methoxyphosphine. |
| VII | Bis(4-nitrophenyl)bromophosphine | Ethanol | 1:1 | Triethylamine | 20 | Benzene | Bis(4-nitrophenyl)ethoxyphosphine. |
| VIII | Chloroethylphenylphosphine | Butanol | 2:1 | Tributylamine | 30 | Pyridine | Ethylbutoxyphenylphosphine. |
| IX | Bis(2-methylphenyl)bromophosphine | Ethanol | 1:1 | do | 20 | Dimethylaniline | Bis(2-methylphenyl)ethoxyphosphine. |
| X | Bis(1-naphthyl)chlorophosphine | do | 1:1.5 | Triethylamine | 18 | Benzene | Bis(1-naphthyl)ethoxyphosphine. |
| XI | Chlorododecylphosphine | Propanol | 1:1 | Tripropylamine | 22 | Tetrahydrofuran | Didodecylpropoxyphosphine. |
| XII | Chlorodioctadecylphosphine | Ethanol | 1.5:1 | Triethylamine | 35 | Butane | Dioctadecylethoxyphosphine. |

TABLE II

*Equation (b)*

| Ex. No. | Tertiary Phosphine Reactant | Halide Reactant | Ratio halide to phosphine | Temperature, °C. | Product |
|---|---|---|---|---|---|
| II | Butoxydicyclohexylphosphine | 1,2-dichloroethane | 1.5:1 | Reflux | 2-chloroethyldicyclohexyl-phosphine oxide. |
| III | ___do___ | 1,2-dibromethane | 2:1 | 28 | 2-bromoethyldicyclohexyl-phosphine oxide. |
| IV | Ethoxymethylethylphosphine | 1,1,2,2-tetrachloroethane | 3:1 | Reflux | Ethylmethyl-1,2,2-trichloroethylphosphine oxide. |
| V | Dibutylpropoxyphosphine | 1-bromo-2-chloroethane | 1.5:1 | 20 | 2-chloroethyldibutylphosphine oxide. |
| VI | Bis(2 - chlorophenyl)methoxy - phosphine | 1,1,2,2-tetrabromoethane | 2:1 | 30 | Bis(2 - chlorophenyl)1,2,2 - tribromoethylphosphine oxide. |
| VII | Bis(4-nitrophenyl)ethoxy-phosphine | 3,4-dichlorobutene-1 | 4:1 | 40 | Bis(4 - nitrophenyl)4 - chloro - 1,2 - butenylphosphine oxide. |
| VIII | Butoxyethylphenylphosphine | 1,2-dichlorooctane | 1.5:1 | 60 | 2-chlorooctylethylphenyl-phosphine oxide. |
| IX | Bis(2 - methylphenyl)ethoxy phosphine | 1,2-dibromooctadecane | 2:1 | 55 | Bis(2-methylphenyl)2-bromooctadecylphosphine. |
| X | Bis(1-naphthyl)ethoxyphosphine | 1,2-dichlorododecane | 2:1 | 65 | Bis(1-naphthyl)2-chlorododecylphosphine oxide. |
| XI | Dioctylpropoxyphosphine | 1,2-dichlorobutane | 7:1 | 60 | Dioctyl-2-chlorobutyldioctylphosphine oxide. |
| XII | Dioctadecylethoxyphosphine | 1,2-dichlorodecane | 3:1 | 80 | 2-chlorodecyldioctadecylphosphine oxide. |

TABLE III

*Equation (c)*

| Ex. No. | Reactant | Base | Solvent | Temperature, °C. | Product |
|---|---|---|---|---|---|
| II | 2 - chloroethyldicyclo - hexylphosphine oxide | NaOH | Isopropanol | 25 | Dicyclohexylvinylphosphine oxide. |
| III | 2-bromoethyldicyclo-hexylphosphine oxide | KOH | Methanol | 20 | Do. |
| IV | Ethylmethyl - 1, 2, 2 - trichloroethylphosphine oxide | $NaOC_2H_5$ | Ethanol | 22 | Ethyl - 1,2 - dichloroethenylmethylphosphine oxide. |
| V | 2-chloroethyldibutylphosphine oxide | LiOH | ___do___ | 24 | Dibutylvinylphosphine oxide. |
| VI | Bis(2 - chlorophenyl)1, 2, 2 - tribromoethyl - phosphine oxide | Triethylamine | Toluene | (¹) | Bis(2 - chlorophenyl) - 1, 2 - dibromoethenylphosphine oxide. |
| VII | Bis(4 - nitrophenyl)4 - chloro - 1, 2 - butenyl - phosphine oxide | $NaOCH_3$ | Methanol | 23 | Bis(4-nitrophenyl)butadienylphosphine oxide. |
| VIII | 2-chlorooctylethylphenyl-phosphine oxide | $NH_4OH$ | Ethanol | 28 | Ethyl-1,2-octenylphenylphosphine oxide. |
| IX | Bis(2 - methylphenyl)2 - bromooctadecylphosphine oxide | NaOH | Isopropanol | 23 | Bis(2 - methylphenyl)- 1, 2 - octadecenylphosphine oxide. |
| X | Bis(1 - naphthyl)2 - chlorododecylphosphine oxide | Tributylamine | Benzene | (¹) | Bis(1 - naphthyl)1, 2 - dodecenylphosphine oxide. |
| XI | 2-chlorobutyldioctylphosphine oxide | $KOC_3H_7$ | Propanol | 21 | 1,2-butenyldioctylphosphine oxide. |
| XII | Dioctadecyl - 2 - chlorodecyldioctadecylphosphine oxide | KOH | Ethanol | 23 | 1,2-decenyldioctadecylphosphine oxide. |

¹ Solvent reflux.

The novel olefinically-unsaturated tertiary phosphine oxides described hereinabove may be homopolymerized. Polymerization is effected by conventional means using a polymerization catalyst, such as di-tertiary-butylperoxide, benzoylperoxide, azobisisobutyronitrile, or the like. Generally, reaction is made to take place in the presence of a solvent, such as an aromatic hydrocarbon. Benzene, toluene, xylene, and the like, are typical. The temperature of the reaction is generally determined by the type of catalyst employed.

The following example is illustrative:

EXAMPLE XIII

A mixture of 2.13 grams of diphenylvinylphosphine oxide and 0.02 gram of di-tertiary-butylperoxide is placed in a heavy-walled tube which has been twice degassed at —78° C. The tube is sealed under vacuum and heated at 135° C. The mixture which is a fluid liquid becomes glass-like at this temperature in about 24 hours. After 48 hours of heating at this temperature, the heavy-walled tube is opened and its contents dissolved in chloroform and precipitated in heptane. Infrared analysis shows no vinyl moieties. The intrinsic viscosity of this material determined in 2B alcohol at 30° C. using a Cannon-Ubbelohde semi-micro dilution viscometer is [n]=0.02. The average molecular weight of the homopolymeric material produced as just described is 1348, as determined by the conventional micro-analysis technique.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. Novel olefinically-unsaturated tertiary phosphine oxides of the formula

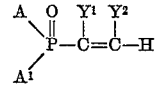

wherein A and A¹ respectively, represent a member selected from the group consisting of alkyl $C_1$–$C_{18}$, substituted and unsubstituted, substituted phenyl, naphthyl, and cycloalkyl, substituted and unsubstituted; said substituents for alkyl, phenyl, and cycloalkyl being selected from the group consisting of nitro, cyano, and halogen; $Y^1$ is a member selected from the group consisting of hydrogen and halogen and $Y^2$ is a member selected from the group consisting of hydrogen, halogen, alkyl $C_1$–$C_{16}$, and alkenyl $C_1$–$C_{16}$.

2. Dicyclohexylvinylphosphine oxide.

3. Dibutylvinylphosphine oxide.

4. A method which comprises reacting a secondary phosphine halide of the formula

wherein X is halogen and A and A¹, respectively, represent a member selected from the group consisting of alkyl $C_1$–$C_{18}$, substituted and unsubstituted, substituted phenyl, naphthyl, and cycloalkyl, substituted and unsubstituted, said substituents for alkyl, phenyl and cycloalkyl being selected from the group consisting of nitro, cyano, and halogen, with lower alkyl, monohydric alcohol ROH wherein R is the residue of a primary, saturated lower monohydric alcohol, in the presence of a tertiary amine to produce the corresponding tertiary phosphine of the formula

wherein A and A¹ have the meaning given above and R is the alkyl residue of said alcohol reactant; said tertiary phosphine, in turn, is reacted with a halide of the formula

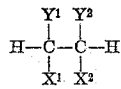

wherein $Y^1$ is a member selected from the group consisting of hydrogen and halogen, $Y^2$ is a member selected from the group consisting of hydrogen, halogen, alkyl $C_1$–$C_{16}$, and alkenyl $C_1$–$C_{16}$, $X^1$ and $X^2$, respectively, represent halogen, and producing the corresponding tertiary phosphine oxide of the formula

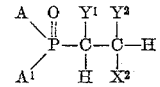

wherein A, $A^1$, $Y^1$, $Y^2$ and $X^2$ have the meaning given above; and, in turn, reacting said tertiary phosphine oxide with a base to produce the corresponding unsaturated tertiary phosphine product of the formula

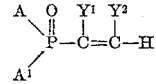

wherein, likewise, A, $A^1$, $Y^1$ and $Y^2$ have the meaning given above.

References Cited in the file of this patent

Kosolapoff: Organophosphorus Compounds, John Wiley and Sons, Inc., New York, 1950, page 116.